United States Patent
Montoya et al.

(10) Patent No.: US 11,051,247 B2
(45) Date of Patent: Jun. 29, 2021

(54) TRANSMISSION/ RECEPTION DEVICE WITH WAKE-UP RADIO RESISTANT TO ATTACKS BY DENIAL OF SLEEP

(71) Applicant: COMMISSARIAT A L'ENERGIE ATOMIQUE ET AUX ENERGIES ALTERNATIVES, Paris (FR)

(72) Inventors: Maxime Montoya, Grenoble (FR); Simone Bacles-Min, Grenoble (FR); Anca Molnos, Saint Martin le Vinoux (FR); Jacques Fournier, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 98 days.

(21) Appl. No.: 16/054,291

(22) Filed: Aug. 3, 2018

(65) Prior Publication Data
US 2019/0045442 A1 Feb. 7, 2019

(30) Foreign Application Priority Data
Aug. 4, 2017 (FR) ...................... 17 57549

(51) Int. Cl.
*H04W 52/02* (2009.01)
*H04L 9/00* (2006.01)
*H04L 9/32* (2006.01)
*G06F 1/3287* (2019.01)
*H04L 9/06* (2006.01)

(52) U.S. Cl.
CPC ...... *H04W 52/0229* (2013.01); *G06F 1/3287* (2013.01); *H04L 9/002* (2013.01); *H04L 9/0631* (2013.01); *H04L 9/0643* (2013.01); *H04L 9/3213* (2013.01); *H04L 9/3236* (2013.01)

(58) Field of Classification Search
CPC .. H04W 52/0229; H04L 9/002; H04L 9/3236; H04L 9/0631; H04L 9/0643; H04L 9/3213; G06F 1/3287
See application file for complete search history.

(56) References Cited

U.S. PATENT DOCUMENTS

| 2017/0134943 | A1 | 5/2017 | Min et al. |
| 2018/0019902 | A1* | 1/2018 | Suh .................... H04L 27/2602 |
| 2018/0026950 | A1* | 1/2018 | Wasiq ................ H04L 63/0428 713/152 |

(Continued)

OTHER PUBLICATIONS

U.S. Appl. No. 15/510,425, filed Mar. 10, 2017, US-2017-0310688-A1, Maxime Lecomte, et al.

(Continued)

*Primary Examiner* — Alex Skripnikov
*Assistant Examiner* — Sharmin Chowdhury
(74) *Attorney, Agent, or Firm* — Oblon, McClelland, Maier & Neustadt, L.L.P.

(57) ABSTRACT

A transmission/reception device with wake-up radio for a node with limited resources such as an IoT network node. The device includes a permanently powered auxiliary circuit, capable of detecting a wake-up token, and a main circuit, normally in the idle state and activated by the auxiliary circuit when a wake-up token is detected. The next wake-up token is calculated by the main circuit by applying a one-way function to at least part of a message exchanged on the main radio through a secure communication.

13 Claims, 2 Drawing Sheets

(56) References Cited

U.S. PATENT DOCUMENTS

2018/0041959 A1* 2/2018 Yang .................. H04W 52/265

OTHER PUBLICATIONS

French Preliminary Search Report dated Apr. 18, 2018 in French Application 17 57549 filed Aug. 4, 2017 (with English Translation of Categories of Cited Documents).
Rainer Falk, et al., "Fighting Insomnia: A Secure Wake-up Scheme for Wireless Sensor Networks," 2009 Third International Conference on Emerging Security Information, Systems and Technologies, pp. 191-196.
Salem Aljareh, et al., "Efficient Time Synchronized One-Time Password Scheme to Provide Secure Wake-Up Authentication Wireless Sensor Networks," International Journal of Advanced Smart Sensor Networks Systems (IJASSN), vol. 3, No. 1, Jan. 2013, pp. 1-11.
Angelo T. Capossele, et al., "Counteracting Denial-of-Sleep Attacks in Wake-up-radio-based Sensing Systems," Proc. of 13th Annual IEEE Int'l Conf. on Sensing, Communication and Networking (SECON), 2016, 9 Pages.

* cited by examiner

TRANSMISSION/ RECEPTION DEVICE WITH WAKE-UP RADIO RESISTANT TO ATTACKS BY DENIAL OF SLEEP

TECHNICAL DOMAIN

This invention relates to Wake-Up Radio transmission/reception devices in general. It is more particularly applicable in the field of the Internet of Things (IoT).

STATE OF PRIOR ART

IoT nodes are subject to strict autonomy constraints. In such nodes, the largest energy consumer is the radio interface. The radio interface is in permanent listening mode which in practice leads to higher consumption, comparable to what would be observed when permanently transmitting data. It has been proposed to use a wake-up radio node architecture like that shown in FIG. 1, to reduce energy consumption.

FIG. 1 diagrammatically shows the structure of an IoT radio wake-up node 100. Most components of the node form part of a main circuit 120, that is idle most of the time. The node also includes an auxiliary circuit 110 called the wake-up radio, the exclusive function of which is to detect wake-up messages and to bring the main circuit out of idle mode when such a message is detected.

The wake-up radio operates at very low data rate and consumes very little energy. It is permanently active (always on circuit) and only contains modules capable of handling wake-up messages.

The main circuit only comes out of idle mode when it is activated by the wake-up radio (on demand circuit) 110. The main circuit comprises particularly a radio circuit 121, called the main radio, responsible for reception and transmission of data, a CPU processor 122, a memory 123 and possibly one or several coprocessors 124.

Since the wake-up radio has very limited communication and processing capacities, wake-up messages must be as simple as possible. Thus, a wake-up message is usually composed of a predefined 8-bit or 16-bit word. The wake-up message is then identical for all the wake-ups. It becomes easy for a badly intentioned third party to capture this message and emit it continuously, which will have the effect of continuously waking up the node and quickly draining its battery. This type of attack is called a DoS (Denial of Sleep) attack.

The wake-up message can be made dynamic to counter denial of sleep attacks, in other words the wake-up token changes after each wake-up such that an attacker cannot reuse a previously used code (elimination of attacks by replay). Moreover, the wake-up token must not be predictable to an attacker. Indeed, an attacker must not be able to predict the next wake-up token starting from previous wake-up tokens.

Several wake-up methods by dynamic wake-up tokens are disclosed in the literature.

A first wake-up method was described in the paper written by R. Falk et al. entitled "Fighting insomnia: a secure wake-up scheme for wireless sensor networks" published in Proc. of 3rd Int'l Conference on Emerging Security Information, Systems and Technologies, 2009, pp. 191-196. With each wake-up, the next wake-up token is transmitted on a secure channel (at link level) through the main radio. The disadvantage of this method is that it increases data exchanges with the main radio, which is expensive in terms of energy.

A second wake-up method was described in the paper written by Aljareh et al. entitled "Efficient time synchronized one-time password scheme to provide secure wake-up authentication on wireless sensor networks" published in Int'l Journal of advanced smart sensor network systems (IJASSN), vol. 3, No. 1, January 2013. According to this method, wake-up of a node B by a node A assumes synchronisation of these nodes and the use of symmetric keys known only by these nodes. Synchronisation of nodes A and B requires that node B is woken frequently and the new wake-up token is calculated, which can be very expensive in terms of energy.

A third wake-up method was described in the paper written by A. T. Capossele et al. entitled "Counteracting denial-of-sleep attacks in wake-up radio-based sensing systems" published in Proc. of $13^{th}$ Annual IEEE Int'l Conf. on Sensing, Communication and Networking (SECON, 2016, pp. 1-9. However, this method involves the exchange of secret symmetric keys dedicated to the wake-up process (the keys are known only to nodes A and B participating in the exchange), the use of shared counters and the addresses of these two nodes. In practice, the use and maintenance of shared counters makes generation of the wake-up token complex. Furthermore, sharing of symmetric keys (generally on 128 or more bits) is expensive in terms of resources; it requires a node authentication protocol and a secure exchange protocol between the nodes, so as to guarantee that only the nodes concerned hold the keys in question. These keys must then be kept secret and protected throughout their life and securely updated, which is very restrictive in terms of security and energy consumption.

Consequently, the purpose of this invention is to disclose a wake-up radio transmission/reception device that does not have the disadvantages mentioned above, namely a transmission/reception device that is resistant to denial of sleep attacks and that also uses a simple wake-up method, without any energy-expensive radio exchanges and without large volume storage of secret keys.

PRESENTATION OF THE INVENTION

This invention is defined by a transmission/reception device with wake-up radio comprising a main circuit and an auxiliary circuit, the auxiliary circuit being permanently powered, the main circuit by default being in an idle state in which it is not powered, and is woken up by the auxiliary circuit whenever the auxiliary circuit detects a wake-up token from an IoT network node, the main circuit being powered when it is thus woken and setting up a secure communication with said node, the main circuit thus woken up being capable of calculating a next wake-up token ($WTU_{n+1}$) by applying a one-way function ($F_\rightarrow$) on at least part of a message ($Message_{n,k}$) received from or transmitted to said node through the secure communication, said received or transmitted message consisting of a payload of a sequence of data packets, said next wake-up token thus obtained being supplied to the auxiliary circuit for subsequent detection.

For example, the one-way function can be applied to at least part of the first message received from or transmitted to said node through the secure communication, after the main circuit has been woken up.

Alternatively, the one-way function can be applied to at least part of the last message received from or transmitted to said node through the secure communication, before the main circuit has returned to the idle state.

For example, the secure communication can use an AES encryption and the one-way function is applied to the MAC code of said message.

According to a second variant embodiment, said message is combined by means of a combination function with the last wake-up token, before application of the one-way function.

According to a third variant embodiment, said message is combined by means of a combination function with output from a counter incremented at each wake-up of the main circuit, before application of the one-way function.

In particular, the combination function can be a concatenation operation.

The one-way function is a hash function. The hash result can then be truncated to a predetermined number of bits to supply said next wake-up token.

Alternatively, the one-way function can be an exponentiation or a multiplication.

Advantageously, the next wake-up token supplied by the main circuit is stored in a register of the auxiliary circuit, before the main circuit returns to the idle state.

BRIEF DESCRIPTION OF THE DRAWINGS

Other characteristics and advantages of the invention will become clear after reading a preferred embodiment of the invention, given with reference to the appended figures among which.

DETAILED PRESENTATION OF PARTICULAR EMBODIMENTS

The following will consider a pair of nodes A and B in an IoT network, node A taking the initiative for a communication with node B. It is assumed that node A is always awake. Node B is equipped with a transmission/reception device comprising an auxiliary circuit or wake-up radio that is permanently powered, and a main circuit that is idle by default but can be activated by the wake-up radio when the auxiliary circuit detects a wake-up token. Typically, node A could be a base station powered through the mains power supply and node B could be a connected object with limited resources and powered by a battery.

It will be assumed that data messages exchanged between node A and node B through the main radio are exchanged through a secure communication. More precisely, these messages are encrypted and preferably authenticated. A message means here a useful message i.e. a sequence of communication data packets, or even the payload of these packets. More generally, it may consist of at least one communication data packet or a part thereof. Hence, in this respect, a control message only (such as a management frame for example) would not qualify as a useful message. When a (useful) message is transmitted through the secure communication, this message is encrypted using a symmetric or asymmetric encryption algorithm.

Most communication protocols for the IoT such as IEEE 802.15.4 (on which the Zigbee and 6LoWPAN protocols are based), or LoRa, Sigfox, Bluetooth Smart (formerly Bluetooth Low Energy) enable such a secure communication.

Figure 1:
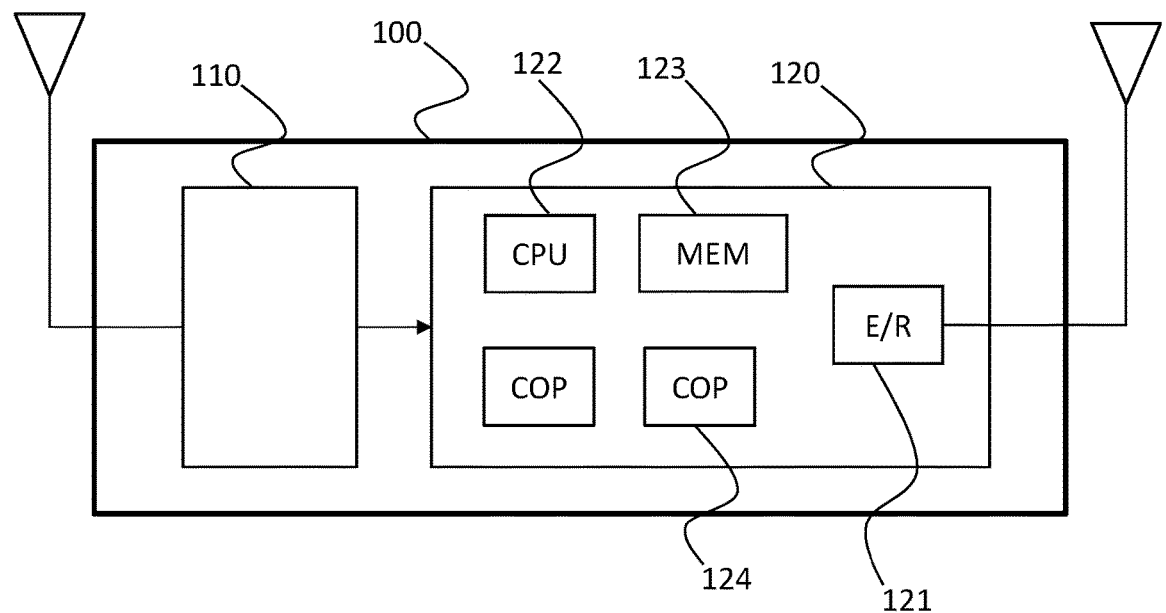
FIG. 1 diagrammatically shows the architecture of an IoT node with radio wake-up.
Figure 2:
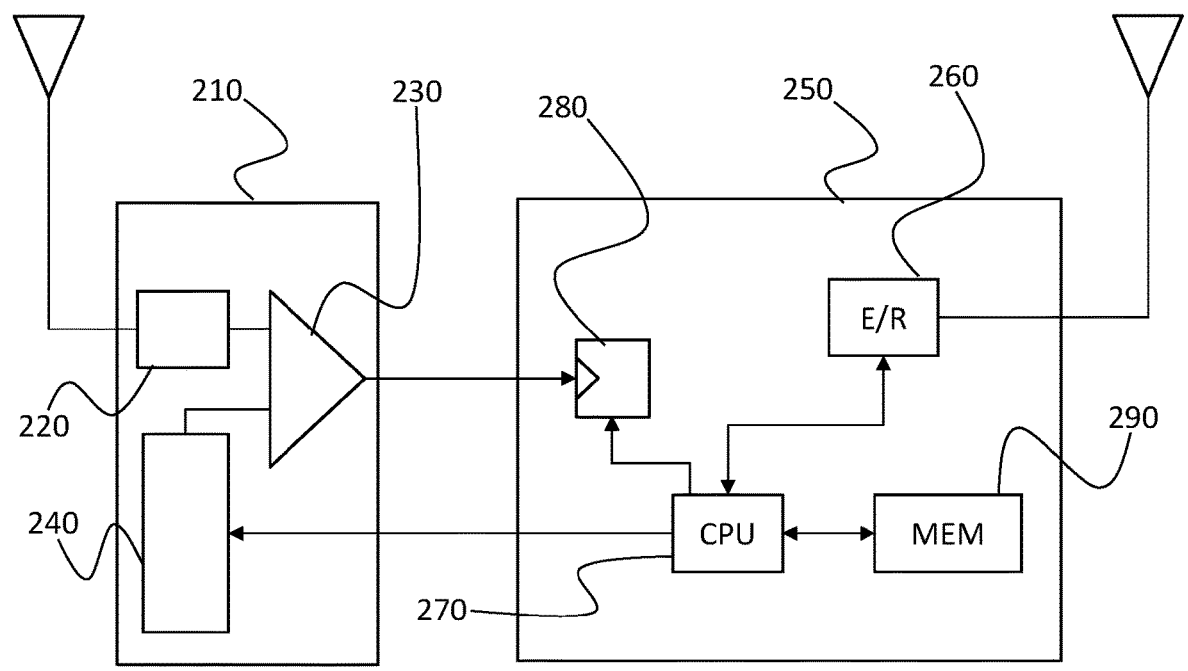
FIG. 2 diagrammatically represents a transmission/reception device with wake-up radio according to one embodiment of the invention.

FIG. 2 diagrammatically represents a transmission/reception device with wake-up radio 200 according to one embodiment of the invention.

The auxiliary circuit implementing the wake-up radio is represented in 210 and the main circuit of node B is represented in 250.

The auxiliary circuit comprises a reception module 220 connected at the input to an antenna and at the output to the first input to a comparator 230. The reception module receives the antenna signal and continuously converts it into a digital message, the message being offset by one bit at each tick of the sampling clock. The second input to the comparator is connected to a register 240 of the auxiliary circuit, said register having a number of bits equal to the number of bits in the wake-up token. The comparator compares the received digital message and the content of the register bit by bit. In other words, the comparator makes a sliding correlation between the received bit stream and the content of the register.

The comparator output is connected to the main circuit to supply the wake-up signal. For example, this wake-up signal switches the state of a toggle 280 of the main circuit, this state indicating if the main circuit is idle or active (in other words powered).

The main circuit 250 comprises a transmission/reception module 260 corresponding to the main radio and at least one processor 270. The processor is programmed to perform decryption operations on messages received from the main radio and to calculate the next Wake-Up Token), $WUT_{n+1}$ from at least one message, $Message_{n,k}$, received from or transmitted to the node A, by means of the main radio, after waking-up by the last wake-up token, $WUT_n$, transmitted by node A. In this case, the notation $Message_{n,k}$ conventionally means that it is the $k^{th}$ message exchanged between nodes A and B after the $n^{th}$ wake-up of the node B.

Alternatively, the next wake-up token can be calculated by a dedicated hardware circuit (for example ASIC or FGPA), which can further reduce energy consumption.

The message used to calculate the code $WUT_{n+1}$ may for example be the first message ($Message_{n,1}$) received by node A after the $n^{th}$ wake-up of the main circuit, or even the last message ($Message_{n,K}$) received by this node before it returns to the idle state. Alternatively, it can be the result of the concatenation of several messages received on the main radio after the $n^{th}$ wake-up by the $WUT_n$ code.

In the simplest variant, the $WUT_{n-1}$ code can be obtained by:

$$WUT_{n+1}=F_{\rightarrow}(Message_{n,k}) \quad (1)$$

in which the function $F_{\rightarrow}(\cdot)$ is a one-way function. It will be remembered that a one-way function is a function for which the inverse cannot be calculated in polynomial time. This one-way function could for example be an exponentiation operation with a large number (on the multiplication group of a finite body), a multiplication by a very large number or a cryptographic hash function or even a combination of several of these operations. If required, it would also be possible to truncate the result to obtain a word of the required size (for example a 32-bit word).

According to a second variant, the code $WUT_{n+1}$ is obtained from at least one message $Message_{n,k}$ combined with the previous wake-up token $WUT_n$, in other words:

$$WUT_{n+1}=F_{\rightarrow}(C(WUT_n,Message_{n,k})) \quad (2)$$

in which C is a combination function. According to one example embodiment, we could choose:

$$WUT_{n+1}=F_\rightarrow(WUT_n \| Message_{n,k}) \quad (3)$$

in which $\cdot \| \cdot$ represents the concatenation operation.

Instead of a single message, $Message_{n,k}$, exchanged (received or sent) with node A, the wake-up token according to $WUT_{n+1}$ can be calculated using several messages $Message_{n,k}$, $1 \leq k \leq K$, exchanged with node B during secure communications initiated by previous wake-ups.

The calculation variant given by expressions (2) and (3) has the advantage of being recursive. Thus, assuming that two identical messages are sent at two different wake-ups ($Message_{n+1,k}=Message_{n,k}$ for example), the wake-up tokens obtained will be different. Even if an attacker succeeds in accessing the secure communication encryption keys, he would need to access all the previous wake-up tokens to determine the next wake-up token. Therefore it is impossible to predict the next wake-up token for node B without knowing the encryption key of the main radio and the history of its wake-up tokens.

According to a third variant, the next wake-up token is not directly obtained by recursively applying the one-way function but resorts to an underlying recursive process. More specifically, a long version of the wake-up token $WUT_{n,long}$ is recursively calculated, as in expressions (2) and (3), namely:

$$WUT_{n+1,long}=F_\rightarrow(C(WUT_{n,long}, Message_{n,k})) \quad (4)$$

and, in the specific case where the combination is a concatenation:

$$WUT_{n+1,long}=F_\rightarrow(WUT_{n,long} \| Message_{n,k}) \quad (5)$$

However, this long version $WUT_{n,long}$ is not sent to the main circuit as wake-up token but is truncated to a predetermined number of bits to generate the wake-up token in question, that is:

$$WUT_{n+1}=trunc(WUT_{n+1,long}) \quad (6)$$

where trunc is a truncation operation or more generally a selection of a certain number of bits of the word as an argument.

This variant offers a higher degree of security since the recursive process is hidden by the truncation operation. More specifically, neither the long version $WUT_{n,long}$ of the wake-up token nor the message $Message_{n,k}$ can be directly accessed from the transmission channel, the former because only the short (truncated) version is transmitted in plaintext, the latter because the communication is encrypted.

According to a fourth variant, the calculation of the next wake-up token uses a counter number in addition to a message previously exchanged in secure form through the main radio. In this case, expressions (1) to (6) become:

$$WUT_{n+1}=F_\rightarrow(Message_{n,k} \| n) \quad (7)$$

$$WUT_{n+1}=F_\rightarrow(C(WUT_n, Message_{n,k}, n)) \quad (8)$$

$$WUT_{n+1}=F_\rightarrow(WUT_n \| Message_{n,k} \| n) \quad (9)$$

$$WUT_{n+1,long}=F_\rightarrow(C(WUT_{n,long}, Message_{n,k}, n)) \quad (10)$$

$$WUT_{n+1,long}=F_\rightarrow(WUT_{n,long} \| Message_{n,k} \| n) \quad (11)$$

where, of course, $WUT_{n+1}=trunc(WUT_{n+1,long})$, in case of expressions (10) and (11). Here, the counter has been taken equal to the number of wake-ups but it could be possibly a submultiple thereof.

In case of the fourth variant, the truncation operation can evolve according the counter output:

$$WUT_{n+1}=trunc(WUT_{n+1,long}, n) \quad (12)$$

For example, the bits selected to be retained by the truncation may depend upon n.

In the second and third variants, due to recursiveness, the first wake-up token must be known by nodes A and B. To achieve this, the wake-up token is initialised after exchanging cryptographic material (secret keys, initialisation vector, identifiers, addresses, etc.) necessary to set up a secure communication between nodes A and B. The first wake-up token can then be determined by encrypting predetermined information using previously exchanged keys, for example a predetermined message known in advance by nodes in the network, in that it will be impossible for an attacker who does not have these secret keys to predict the encrypted message. For example, if all nodes use different keys, the initial wake-up token will be different for each node. Alternatively, the first wake-up token may be obtained by applying a one-way function, for example a hash function, to the secret key which will be used for encrypting the communication. In order to customize the wake-up token according to the node to be woken-up, the secret key could be concatenated with the identifier of the node in question, prior to applying the one-way function.

Regardless of which variant is envisaged it will be sufficient to use only part of the message or messages transmitted on the main radio for the calculation of the next wake-up token.

In some protocols and particularly IEEE 802.15.4, Bluetooth Smart, using an AES encryption method for the authenticated encryption such as CCM mode, a MAC (Message Authentication Code) is calculated for each message using the useful content of the message and other data in the radio packet, and is then encrypted and added to the sent packet. The MAC code can then be used as part of the message as an argument in expressions (1) to (6). The advantage of using the MAC code is that it is smaller and less repetitive than the messages themselves in that it contains information such as the number of messages exchanged or the addresses of nodes.

Figure 3:
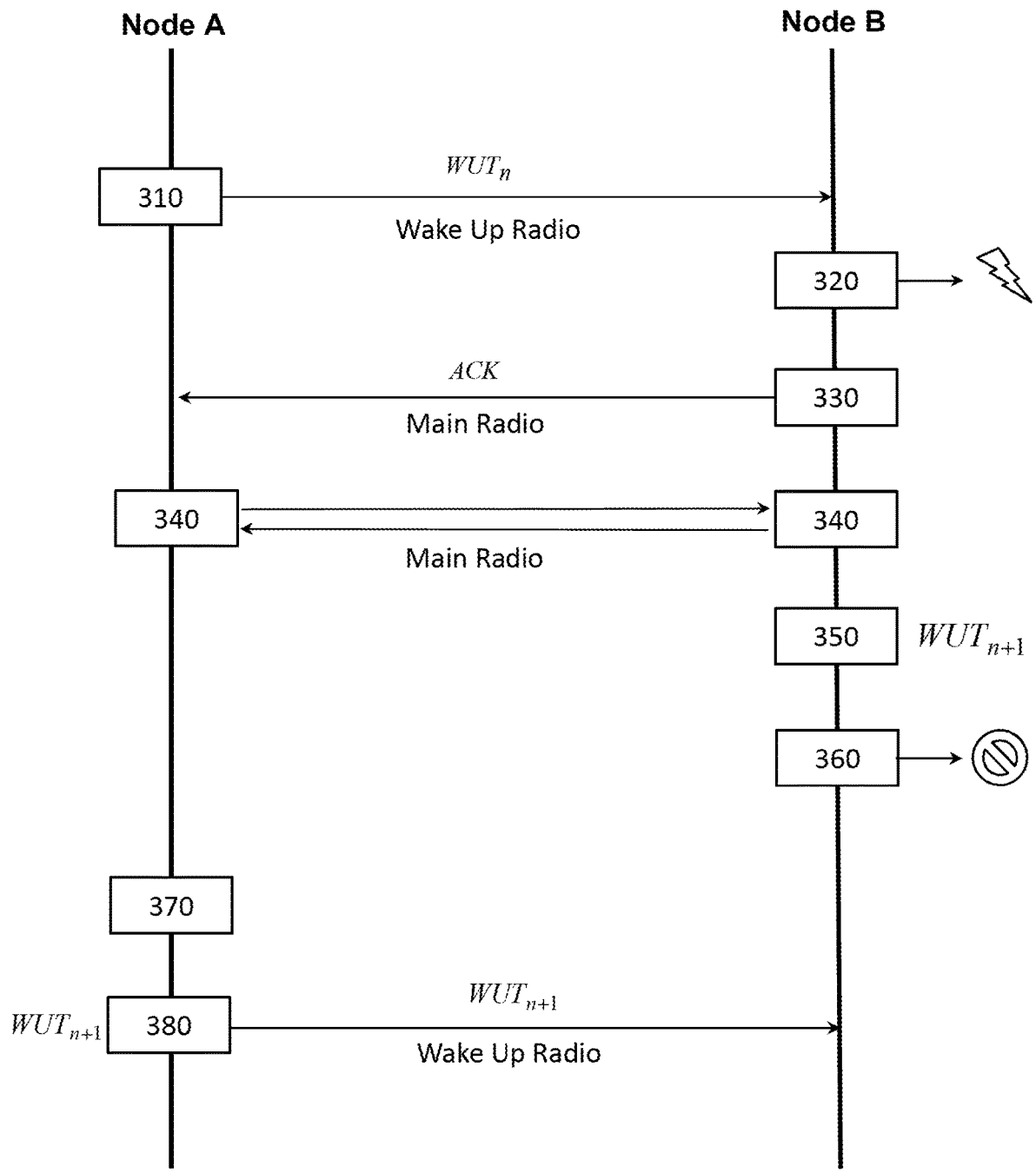
FIG. 3 diagrammatically represents a time diagram of exchanges between a first IoT node and a second IoT node on which the device in FIG. 2 is installed.

FIG. 3 diagrammatically represents a time diagram of exchanges between the above-mentioned nodes A and B, between two consecutive wake-ups of the node B.

It is assumed that an exchange of cryptographic material was made between nodes A and B, and that the wake-up token was previously initialised. The cryptographic material is used to set up a secure communication between the two nodes on the main radio.

It is assumed that node B is initially in the idle state, in other words its main circuit is not active. On the other hand, its auxiliary circuit is permanently powered but its consumption is minimal due to the very small number of components that it contains.

In step 310, node A would like to initiate a data exchange with node B and transmit a wake-up token $WUT_n$ to it for this purpose.

This wake-up token was firstly stored in the register in the auxiliary circuit. The auxiliary circuit of node B compares the wake-up token received from node A with the wake-up token stored in its register and, after detecting that they are identical, activates the main circuit in 320.

In step 330, node B returns an acknowledgement to node A on the main radio, using the secure communication means, to notify that it has changed to the active state.

In step 340, nodes A and B exchange data messages on the main channel, using the secure communication.

At the end of the exchange, in step 350, the main circuit of node B calculates the next wake-up token according to one of the variants described above. However it will be noted that depending on the variant (calculation made from the last received message or transmitted after the wake-up), the next wake-up token can be calculated before the end of the exchange.

According to one typical example of implementation of the second variant, the processor of the main circuit calculates the next wake-up token using:

$$WUT_{n+1}=\text{trunc}[\text{hash}(WUT_n \| \text{Message}_{n,k})] \tag{13}$$

The hash function hash can be a function of the SHA-2 (Secure Hash Algorithm) family, and particularly the SHA-256 function. The truncation operation trunc may for example be a truncation on 32 bits. The message $\text{Message}_{n,k}$ may for example be the last exchanged message or part of the last exchanged message.

The next wake-up token is stored in the register (32 bits in the above example) of the auxiliary circuit to detect a wake-up order.

The main circuit of node B then puts itself into the idle state in 360 by changing the state of its toggle.

At the same time, node A calculates the next wake-up token $WUT_{n+1}$ in 370. It has the same information as node B for this purpose, in fact the messageMessage$_{n,k}$, sent or received by this node and the wake-up token $WUT_n$ that it transmitted to node B in step 310.

It will thus subsequently be able to order node B to wake-up in 380 by transmitting the previously calculated token $WUT_n$ to it on the wake-up radio.

It will be noted that the transmission/reception device with wake-up radio according to the invention does not require any additional exchanges that are not already involved in exchanges of useful messages on the main radio. In other words, there is no need to exchange a specific message dedicated to the computation of a wake-up token. Furthermore, it does not require additional time synchronisation between nodes A and B. On the other hand, unlike most solutions according to the state of the art, the proposed wake-up method does not need management of additional symmetric keys for the wake-up radio, and particularly obtaining them, storing them and updating them, which is advantageous both for energy consumption and for security. Finally, when a lightweight hash (such as Spongent or Keccak) is used as a one-way function, the calculation of the next wake-up token by the main circuit is particularly simple and the energy consumption corresponding to this calculation is very small, a fortiori when it is done by a dedicated hardware circuit as mentioned above.

It will be understood that other types of one-way functions and/or other arguments of this function making use of messages exchanged by secure communication on the main radio can be envisaged by the man skilled in the art without going outside the scope of the present invention.

The invention claimed is:

1. A transceiver device with wake-up radio comprising:
a main circuit being, by default, in an idle state in which the main circuit is not powered; and
an auxiliary circuit being permanently powered, wherein the main circuit is woken up from the idle state by the auxiliary circuit in response to a detection by the auxiliary circuit of a wake-up token from an IoT network node,
the main circuit is powered when the main circuit is woken from the idle state and sets up a secure communication with said IoT network node,
wherein the main circuit, after being woken up from the idle state, is configured to calculate a next wake-up token by applying a one-way function on at least part of a message received from or transmitted to said IoT network node through the secure communication,
said received or transmitted message consists of at least one communication data packet including a payload that is used to obtain the next wake-up token, and said next wake-up token is obtained and supplied to the auxiliary circuit for subsequent detection.

2. The transceiver device with wake-up radio according to claim 1, wherein, after the main circuit is woken up from the idle state, the one-way function is applied to at least part of a first message of a plurality of messages received from or transmitted to said IoT network node through the secure communication.

3. The transceiver device with wake-up radio according to claim 1, wherein, before the main circuit returns to the idle state, the one-way function is applied to at least part of a last message of a plurality of messages received from or transmitted to said IoT network node through the secure communication.

4. The transceiver device with wake-up radio according to claim 2, wherein the secure communication uses an AES encryption and the one-way function is applied to a Message Authentication Code (MAC) of said message.

5. The transceiver device with wake-up radio according to claim 1, wherein, before application of the one-way function, said message is combined by means of a combination function with the last wake-up token.

6. The transceiver device with wake-up radio according to claim 1, wherein, before application of the one-way function, said message is combined by means of a combination function with an output from a counter incremented at each wake-up of the main circuit.

7. The transceiver device with wake-up radio according to claim 1, wherein said message is combined by means of a combination function with a long wake-up token, as calculated for the last wake-up, and a new long wake-up token is calculated by applying the one-way function to the combined message and the long wake-up token, the wake-up token being obtained by truncating said new long wake-up token.

8. The transceiver device with wake-up radio according to claim 6, wherein the combination function is a concatenation operation.

9. The transceiver device with wake-up radio according claim 1, wherein the one-way function is a hash operation.

10. The transceiver device with wake-up radio according to claim 9, wherein a hash result of the hash operation is truncated to a predetermined number of bits to supply said next wake-up token.

11. The transceiver device with wake-up radio according to claim 1, wherein the one-way function is an exponentiation.

12. The transceiver device with wake-up radio according to claim 1, wherein the one-way function is a multiplication.

13. The transceiver device with wake-up radio according to claim 1, wherein, before the main circuit returns to the idle state, the next wake-up token supplied by the main circuit is stored in a register of the auxiliary circuit.

* * * * *